United States Patent [19]

Uroshevich

[11] 4,290,418
[45] Sep. 22, 1981

[54] SOLAR COLLECTORS

[75] Inventor: Miroslav Uroshevich, Cincinnati, Ohio

[73] Assignee: Alpha Solarco Inc., Cincinnati, Ohio

[21] Appl. No.: 52,087

[22] Filed: Jun. 25, 1979

[51] Int. Cl.³ .............................................. F24J 3/02
[52] U.S. Cl. .................................. 126/439; 126/450
[58] Field of Search ............... 126/438, 439, 443, 442, 126/417, 450

[56] References Cited

U.S. PATENT DOCUMENTS

| | | | |
|---|---|---|---|
| 1,661,473 | 3/1928 | Goddard et al. | 126/439 |
| 3,988,166 | 10/1976 | Beam | 126/439 |
| 4,038,972 | 8/1977 | Orrison | 126/439 |
| 4,048,983 | 9/1977 | Pei | 126/438 |
| 4,068,474 | 1/1978 | Dimitroff | 126/439 |
| 4,106,484 | 8/1978 | Dame | 126/438 |
| 4,122,831 | 10/1978 | Mahdjuri | 126/438 |
| 4,129,119 | 12/1978 | Yoke | 126/438 |
| 4,143,643 | 3/1979 | Gerin et al. | 126/438 |
| 4,148,299 | 4/1979 | Sherman | 126/439 |
| 4,153,039 | 5/1979 | Carroll | 126/438 |

*Primary Examiner*—Daniel J. O'Connor
*Attorney, Agent, or Firm*—Gary M. Gron

[57] ABSTRACT

The disclosure illustrates a solar collector of the focusing type comprising a trough like element with an interior reflective surface that faces a main reflector of the collector. A tubular receiver providing a passage for heat transfer fluid is positioned in the trough like element generally along the focal line of the main reflector. A flat glass plate covers the trough along a perimeter seal so that subatmospheric conditions may be maintained within the trough like element to minimize convection heat losses.

3 Claims, 1 Drawing Figure

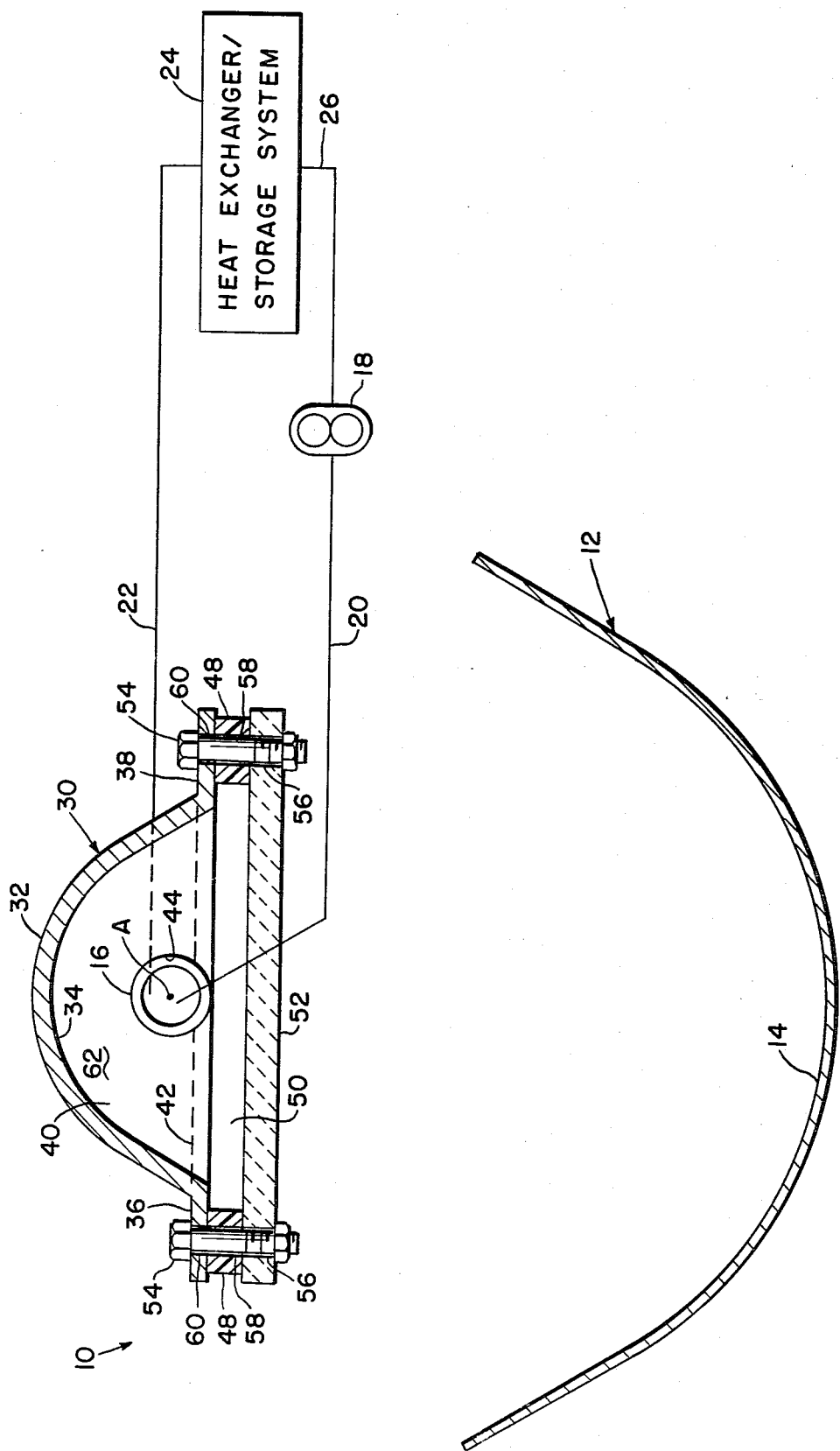

SOLAR COLLECTORS

The present invention relates to solar energy collectors and more specifically to collectors of the focusing type.

The focusing solar collector is felt to be preferable to the flat plate collector in terms of overall performance. The focusing collector usually consists of a concave reflector that focuses parallel rays of solar radiation onto a point or line. A receiver of heat conductive material is positioned at the point or along the line. The receiver has a passage for heat transfer fluid so that the solar radiation absorbed by the receiver is converted into heat energy which is transferred to the fluid for a useable purpose.

It is important that the reflector element be optically precise so that the beam component of solar radiation can be focused along as narrow a line as possible. Unfortunately that does not happen for practical working units. The line along which the solar radiation is focused then becomes a band and in fact, some of the radiation misses the receiver altogether.

To solve this problem, it has been proposed to incorporate a secondary curved reflector, as in U.S. Pat. No. 1,880,938 to refocus the solar radiation onto the receiver for maximum absorption of solar radiation. More recently, U.S. Pat. No. 4,078,549 shows right angle reflectors for such a purpose. While these approaches may be somewhat effective they are generally expensive to manufacture and not capable of mass production.

In accordance with the present invention the above problems are solved in a solar collector having a focusing reflector by an elongated trough like element having a concave reflective surface which faces the reflector. An elongated receiver for heat transfer fluid is positioned in the trough like element generally along the focus line of the reflector. A flat glass plate covers the trough and a gas tight seal is provided between the two so that the interior of the trough can be maintained at subatmospheric pressures.

The above and other related features of the present invention will be apparent from a reading of the description shown in the accompanying drawing and the novelty thereof pointed out in the appended claims:

In the drawing the sole FIGURE is a cross-sectional view of a solar collector embodying the present invention.

In the discussion that follows, elements will be referred to as elongated although only a cross section of the element is shown to simplify the discussion of the present invention. It is understood that the element may have any length necessary to fulfill a particular purpose and the length may even be less than its width.

The FIGURE shows a solar collector 10 comprising an elongated main reflector element 12 having a concave reflector surface 14, preferably with a parabolic cross section shape. The nominal line of focus for main reflector 14 is designated as A, although as pointed out above, the optical imperfections in reflector 12 cause the reflected rays to be scattered somewhat. A receiver comprising an elongated heat conductive tubular element 16 is positioned so that it is generally coaxial with line A.

Tubular element 16 provides a passage for heat transfer fluid that is pressurized by a pump 18 for delivery through a conduit 20 to tubular element 16 where it receives a heat input because of the absorbed solar radiation. From there the heated fluid passes through conduit 22 to a heat exchanger/storage system 24 where heat is either given up or stored according to system requirements. A conduit 26 completes the loop to pump 18.

Tubular element 16 is mounted in an elongated trough like element 30 comprising a center section 32 having a concave secondary reflective surface 34 facing the main reflective surface 14. Preferably the secondary reflective surface 34 has a parabolic cross-section configuration. The center section 32 connects with integral marginal elongated flanges 36, 38 that lie substantially in the same plane. It is preferable that the cross section shape of element 34 be uniform throughout its length so that it may be formed from an extrusion which permits inexpensive mass production. End walls 40, only one of which is shown, are secured to the element 30 by a joint that permits a gas tight connection. If element 30 is formed from metal for example this joint may be made using welding techniques. Walls 40 have integral flanges 42 which are coplannar with and connect with flanges 36, 38 to form a perimeter flange around element 30. An opening 44 through walls 40 permits tubular element 16 to be connected to the exterior of element 30 with a suitable gas tight connection.

A continuous perimeter seal having side sections 48 and end sections 50 is placed over flanges 36, 38 and 42. A flat glass plate 52 is positioned over the perimeter seal and secured to element 30 by suitable spaced fasteners 54 which extend through holes 56 in plate 52, holes 58 in seal 46 and holes 60 in the side flanges 36; 38 and end wall flanges 42. The fasteners 54 are preferably uniformly spaced from one another around the perimeter flange of element 30. The resultant joint between plate 52 and element 30 is sufficiently gas tight to enable the interior 62 of element 30 to be maintained at a subatmospheric pressure, preferably as near vacuum conditions as possible, to minimize convection heat losses from tubular element 16.

In operation, the beam component of solar radiation is reflected by the main reflector 12 toward tubular element 16. Any rays that miss tubular element 16 are reflected by surface 34 onto tubular element 16. The solar radiation absorbed by element 16 is transferred to the heat transfer fluid passing through it. The near vacuum that can be maintained in the interior 62 of element 30 substantially eliminates heat loss from element 16 through convection.

Since element 30 may be made from an extrusion, mass production techniques may be employed to substantially lower the cost of the unit. The flat glass plate is equally inexpensive and readily available.

While a preferred embodiment of the present invention has been described, it should be apparent to those skilled in the art that it may be practiced in other forms without departing from its spirit and scope thereof.

Having thus described the present invention, what is claimed as novel and desired to be secured by Letters Patent of the United States is:

1. A solar energy collector comprising:
    an elongated reflector element for receiving the beam component of solar radiation and focusing it generally along a focal (line) axis;
    an elongated trough like element having a substantially uniform cross-section between its ends and including a concave reflective surface facing said reflector element, said trough like element having flanges integral with the marginal edges thereof, said flanges being in substantially the same plane, said trough like element further including end walls and flanges interconnecting the flanges along said marginal edges and being in the same plane to form a continuous perimeter flange;

an elongated receiver comprising a tubular element extending through said trough and generally coextensive with said focal line, said tubular element providing a passage for heat transfer fluid through said collector;

a flat plate covering said trough, said plate being transparent to solar radiation (: and);

a continuous perimeter seal between the side and end flanges of said trough and said plate, (whereby the) said space therebetween (may be made) being subatmospheric; and, a plurality of discrete fasteners in contact with said plate and said flanges and spaced from one another substantially uniformly around the perimeter flange, said fasteners extending through said transparent sheet and said perimeter flange for placing said continuous perimeter seal in compression.

2. Apparatus as in claim 1 wherein said trough like element is formed from an extrusion having end plates.

3. Apparatus as in claim 1 wherein said trough like element has a parabolic cross section.

* * * * *